United States Patent
Berlowitz et al.

(10) Patent No.: US 6,653,006 B2
(45) Date of Patent: Nov. 25, 2003

(54) SYSTEM FOR FUEL CELL REFORMER START-UP

(75) Inventors: Paul J. Berlowitz, Glen Gardner, NJ (US); Ramesh Varadaraj, Flemington, NJ (US); Frank Hershkowitz, Liberty Corner, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/014,155
(22) Filed: Oct. 29, 2001
(65) Prior Publication Data
US 2003/0082419 A1 May 1, 2003

(51) Int. Cl.[7] .................................................. H01M 8/06
(52) U.S. Cl. ............................... 429/19; 429/17; 429/20
(58) Field of Search ............................. 429/17, 19, 20

(56) References Cited

U.S. PATENT DOCUMENTS

| | | | | |
|---|---|---|---|---|
| 5,827,496 A | * | 10/1998 | Lyon | |
| 6,030,718 A | * | 2/2000 | Fuglevand et al. | ............ 429/26 |
| 2001/0038934 A1 | * | 11/2001 | Berlowitz et al. | ............ 429/19 |

* cited by examiner

Primary Examiner—John S. Maples
(74) Attorney, Agent, or Firm—Ronald D. Hantman

(57) ABSTRACT

The invention includes a start-up system for providing fuel and water as an emulsion to the reformer of a fuel cell and for starting a fuel cell powered vehicle.

18 Claims, 2 Drawing Sheets

Figure 1: Conventional System With Non-Emulsified Fuel

PRIOR ART

SYSTEM FOR FUEL CELL REFORMER START-UP

The present invention relates to a start-up system for a fuel cell. In particular, this invention includes a start-up system for providing fuel and water as an emulsion to the reformer and for starting a vehicle.

Fuel cell systems designed for vehicles need to have water present at all times to serve as a reactant for steam reforming, water-gas shift, and stack humidification. During normal, warmed-up operation water is present in ample quantities, as water is one product of a fuel cell system and cam be recycled to the fuel processor. However, for start-up of the reformer, liquid water must be made available. The current invention provides a system to make available liquid water to the reformer at start-up. The start-up system makes an emulsion of fuel and water on-board the vehicle prior to start-up.

SUMMARY OF THE INVENTION

The present invention is a fuel cell system which includes a reformer, a fuel cell, and start-up system. The start-up system includes a source of an emulsion including water, fuel and surfactant. In a preferred embodiment, the fuel cell system includes a water gas shifter to reduce CO.

In another preferred embodiment of the invention, the fuel cell system includes a conventional fuel cell system and a start-up system for providing an emulsion of fuel and water for starting a vehicle. After the vehicle is started by the start-up system, the conventional fuel cell system takes over to operate the vehicle.

DETAILED DESCRIPTION OF THE PREFERRED EMBODIMENTS

The present invention combines a conventional fuel cell system with a start-up system to start a vehicle by providing start-up power to a vehicle. A conventional fuel cell system includes a source of fuel, a source of water, a source of air, a reformer, a water gas shift reactor and a fuel cell. The fuel cell may include many fuel cells in a stack.

Figure 1:
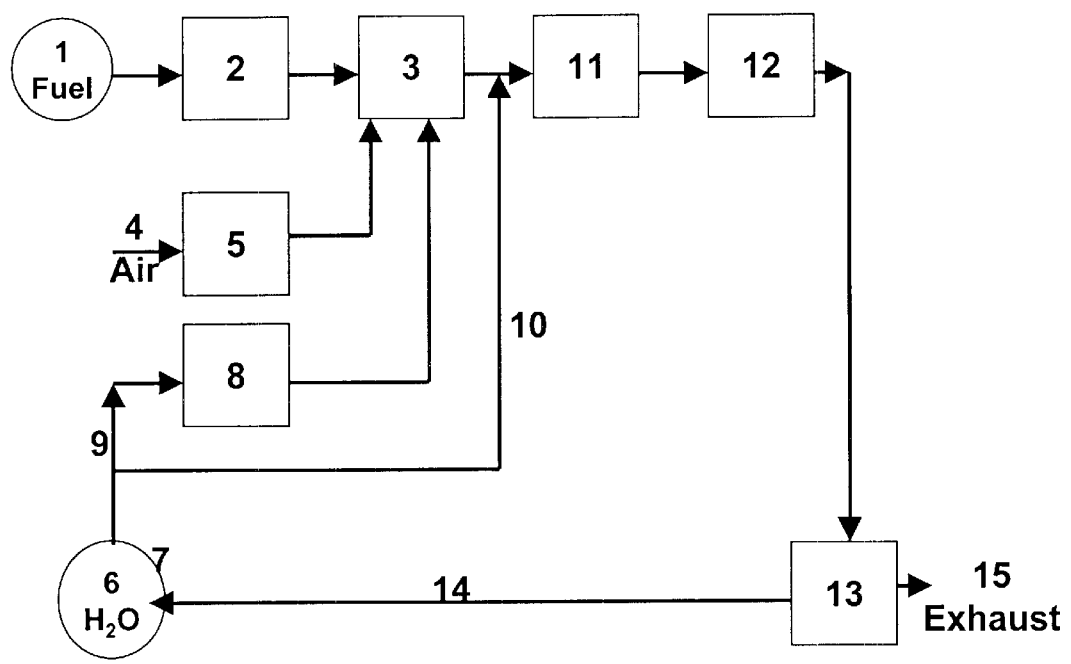
FIG. 1 shows a schematic diagram of a typical prior art conventional fuel cell system.

FIG. 1 shows a schematic of one embodiment of a prior art hydrogen generator based on a hydrocarbon liquid fuel and using partial oxidation/steam reforming to convert the fuel into a syngas mixture. This system design is similar to that being developed by A. D. Little, except for the allowance of feeding water to the reformer to practice autothermal reforming (Ref.: J. Bentley, B. M. Barnett and S. Hynke, 1992 Fuel Cell Seminar—Ext. Abs., 456, 1992). The process in FIG. 1 is comprised as follows: Fuel is stored in a fuel tank (1). Fuel is fed as needed through a preheater (2) prior to entering the reformer (3). Water is stored in a reservoir tank (6). A heat exchanger (7) is integral with a portion of tank (6) and can be used to melt portions of the water if it should freeze at low operation temperatures. Some water from tank (6) is fed via Stream (9) to preheater (8) prior to entering the reformer (3). The reformed syngas product is combined with additional water from tank (6) via stream (10). This humidified syngas mixture is then fed to reactors (11) which perform water gas shift (reaction CO and water to produce more $H_2$ via reaction (1)) and CO cleanup. The $H_2$ rich-fuel stream then enters the fuel cell (12) where it reacts electronically with air (not shown) to produce electricity, waste heat and an exhaust stream containing vaporized water. A hydrogen-oxygen fuel cell as used herein includes fuel cells in which the hydrogen-rich fuel is hydrogen or hydrogen containing gases and the oxygen may be obtained from air. This stream is passed through a condenser (13) to recover a portion of the water vapor, which is recycled to the water reservoir (6) via stream (14). The partially dried exhaust stream (15) is released to the atmosphere. Components 3 and 11 comprise a generalized fuel processor.

The instant invention describes an improved fuel cell system where the vehicle is started by a start-up system. Such a configuration solves many of the problems inherent in starting a vehicle with a conventional fuel cell system, especially for fuel cell vehicle applications.

One embodiment of the start-up system comprises an emulsion container into which are delivered fuel, water and surfactant. The fuel, water and surfactant are stored in separate fuel, water and surfactant containers respectively. The fuel, water, surfactant and emulsion containers comprise the primary components of start-up system. The fuel, water and surfactant containers are connected to the emulsion container through connection tubes or pipes. The emulsion container is connected to the reformer through an injection nozzle. After the emulsion container receives the fuel, water and surfactant components, mixer attached inside the emulsion container mixes the components to form an emulsion, preferably a static mixer. The prepared emulsion is then delivered to the reformer at a rate and for a time required to start-up the vehicle. Means of delivery of the fuel, water, and surfactant (and antifreeze, described below) include a sprayer, vaporizer, injector, or dispenser.

The water container can be insulated to prevent the water from freezing. Alternately, the water container can be attached to a battery to provide heat to the container at start-up should the water be in a frozen state at start-up. An on-board water temperature sensor attached to the water container can activate the heating of the water container so that the water is maintained in liquid form. Yet another method to prevent freezing of the water is to add in antifreeze solution comprised of alcohol or alcohol-water mixture to water in the water container in an amount sufficient to lower the freezing point of water. Antifreeze solution can be stored in a separate antifreeze container. The antifreeze container is connected to the water container. The on-board water temperature sensor activates the dispensing of the antifreeze to the water chamber. The antifreeze container can contain alcohols chosen from the group consisting of methanol, ethanol, propanol, ethylene glycol, propylene glycol and mixtures thereof. Water-alcohol mixtures can also be stored in the antifreeze container. In the fluid dispensed into the emulsion container, the water:alcohol ratio can vary from about 99.1:0.1 to about 20:80, preferably 90:10 to 70:30.

The antifreeze container can serve the dual function of providing antifreeze to the water container as well as a windshield wiper fluid to clean the windshield of a vehicle. This dual functionality of the antifreeze container can eliminate the need for separate windshield wiper container and antifreeze container in the start-up system.

An initial filling of water into the water container is preferred. Thereafter, recycle water from the fuel cell will provide the water required for subsequent start-up of the vehicle. The water storage tank of the conventional fuel cell system can serve the purpose of the water container of the start-up.

The fuel container can be the fuel container of the vehicle or a separate container.

The surfactant can be stored in the surfactant container and is preferred to be stored as a surfactant concentrate. The surfactant concentrate can comprise a mixture of a suitable surfactant or mixtures of surfactants in fuel. The amount of surfactant can vary in the range of about 99 wt % preferably the concentrate is greater than 60% surfactant to about 30 wt %, based on the weight of the concentrate. Optionally, the surfactant concentrate can comprise a mixture of the surfactants in a water-alcohol solvent. The amount of surfactants can vary in the range of about 99 wt % to about 30 wt %, based on the weight of the concentrate preferably the concentrate is greater than 60% surfactant. The water:alcohol ratio can vary from about 99:1 to about 1:99.

In another embodiment of the system, the surfactant container is eliminated and the surfactant is stored in the fuel container or the water container. In this embodiment, the surfactant is in the form of a slow release solid or gel in either the fuel or water container or in both the containers. The slow release solid or gel liberates an amount of surfactant required to form the emulsion. The release properties are such that 50 to 550 ppm of surfactant concentration in fuel or water is attained. One skilled in the art of slow release surfactants can design such a surfactant. In this embodiment, the primary components of the start-up system are the water, fuel and emulsion container.

Another embodiment of the start-up system comprises an in-line mixer. A mixture comprising fuel and surfactant is simultaneously injected with water into the front portion of the in-line mixer. Alternately, a mixture comprising water and surfactant is simultaneously injected with fuel into the front portion of the in-line mixer. The fuel, water and surfactant are mixed as they flow through the in-line mixer. The end portion of the in-line mixer system receives the emulsion and delivers it to the reformer through an injection nozzle. In-line mixers are known to those skilled in the art of mixing fluids. One example of an in-line mixer is a tube fitted with internal fins. The placement of the number and angle of the fins to the circumference of the tube is known to those skilled in the art of in-line mixer design.

Figure 2:
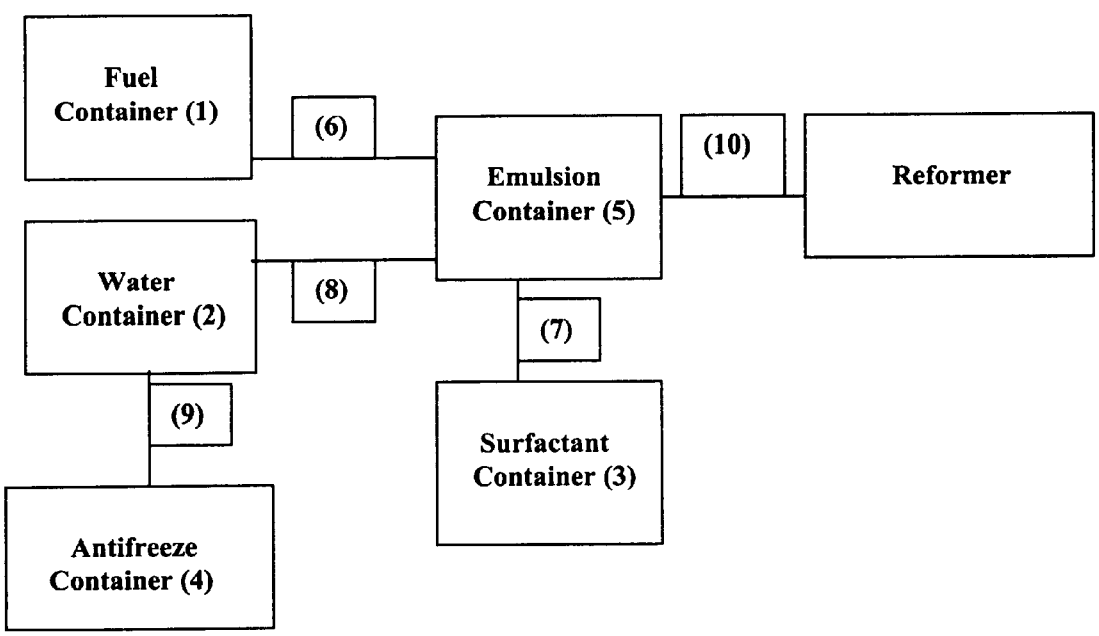
FIG. 2 shows a schematic of one configuration for the fuel cell start-up system of the instant invention.

FIG. 2 shows a schematic of one configuration for the fuel cell start-up system of the instant invention. The system in FIG. 2 is comprised as follows: fuel is stored in a fuel container (1), water in a water container (2), surfactant in a surfactant container (3), antifreeze in an antifreeze container (4) and emulsion is made in an emulsion container (5). The fuel and surfactant containers (1) and (3) are connected to the emulsion container (5) via separate transfer lines (6) and (7) respectively. The water container (2) is connected to the emulsion container (5) via a transfer line (8) to dispense water or water-alcohol mixture to the emulsion container. The water container is further connected to an antifreeze container (4) via a transfer line (9). The emulsion container is fitted with a mixer. An outlet line (10) from the emulsion container (5) is connected to the fuel cell reformer to dispense the emulsion into the reformer at start-up. The fuel, water and surfactant containers are all individually connected to an on-board start-up processor whose signal initiates the dispensing of the fuel, water and surfactant into the emulsion chamber. The water container is connected to a temperature sensor, which senses the temperature of the water in the water container. The temperature sensor is connected to a battery and the antifreeze container. The temperature sensor triggers the heating of the water container or dispensing of the antifreeze as desired.

In one embodiment of the system the water container is the water storage chamber of the conventional fuel cell system.

In another embodiment of the start-up system an in-line mixer substitutes the emulsion container. Fuel, water and surfactant are dispensed into the front end of the in-line mixer. The in-line mixer is comprised of a tubular container fitted with in-line mixing devices known in the art. One example of an in-line mixing device is a series of fins attached perpendicular to the fluid flow. Another example is a series of restricted orifices through which the mixture is propagated. Fuel, water and surfactant are mixed to form an emulsion. The in-line mixer is fitted with an outlet through which the emulsion is dispensed into the reformer.

One advantage of the start-up system of the instant invention is that at start-up, the fuel and water are delivered as an emulsion to the reformer. At start-up, a conventional system has no water. The advantages to using an emulsion includes availability of water at start-up, and a well-mixed water/fuel in injection.

It is preferred to deliver the emulsion as a spray. Delivery as a spray has advantages over vaporization. This is in contrast to a conventional fuel cell system described in FIG. 1 wherein the fuel and air are injected into the reformer as separate reactants, without steam.

The fluid dispensed from the emulsion container or the in-line mixer into the reformer can be a fuel-in-water or water-in-fuel emulsion. Further, the fuel-in-water or water-in-fuel emulsions can be macro-emulsions or micro-emulsion or mixtures thereof. A fuel-in-water emulsion is one where fuel droplets are dispersed in water. A water-in-fuel emulsion is one where water droplets are dispersed in fuel. Both type of emulsion requires appropriate surfactants to form the emulsions of the desired droplet size distribution. If the average droplet sizes of the dispersed phase are less than 1 micron in size, the emulsions are generally termed micro-emulsions. If the average droplet sizes of the dispersed phase droplets are greater than 1 micron in size, the emulsions are generally termed macro-emulsions. One skilled in the art of emulsions can choose appropriate surfactants for the type of emulsions desired.

What is claimed is:

1. A vehicle including a fuel cell system comprising:
   (a) a fuel cell reformer to convert a liquid hydrocarbonaceous fuel and water to a hydrogen containing gas, and a fuel cell;
   (b) a fuel cell start-up system connected to said reformer, said start-up system including a source of an emulsion that includes a means for providing fuel, a means for providing water, and a means for providing surfactant, wherein said source of emulsion is connected to said reformer and all of said means of said fuel start-up system are located on said vehicle.

2. The vehicle of claim 1 wherein said fuel cell start-up system comprises:
   (a) a fuel container,
   (b) a water container,
   (c) a surfactant container, and
   (d) an emulsion container wherein said fuel container is connected to the emulsion container, said surfactant container is connected to the emulsion container, said water container is connected to the emulsion container, and said emulsion container is connected to said reformer.

3. The vehicle of claim 2 wherein said fuel start-up system further comprises an antifreeze container and a temperature sensor, wherein said antifreeze container is connected to said water container and wherein said water container is connected to a temperature sensor and said temperature sensor is connected to the antifreeze container to signal antifreeze dispensing into the water container.

4. The vehicle of claim 2 wherein said start-up system further comprises a start-up processor wherein said fuel, water, surfactant containers, and said emulsion container are connected to said start-up processor such that said start-up processor signals the fuel, water, and surfactant containers to dispense their respective contents to the emulsion container, and signals the emulsion container to dispense its contents to said fuel cell reformer.

5. The fuel container of claim 2 wherein the fuel container is the fuel container of the conventional fuel cell system.

6. The water container of claim 2 wherein the water container is the water storage container of the conventional fuel cell system.

7. The antifreeze container of claim 2 wherein the antifreeze container is the windshield wiper container of the vehicle.

8. The emulsion container of claim 2 wherein the emulsion container is an in-line mixing container.

9. The emulsion container of claim 2 further comprising a static mixer.

10. The fuel cell start-up system of claim 1 comprising:
(a) a fuel container, (b) a water container, (c) an antifreeze container, and (d) an emulsion container, wherein said fuel container is connected to the emulsion container through a fuel transfer medium, said water container is connected to the emulsion container through a water transfer medium, said antifreeze container is connected to the emulsion container through an antifreeze transfer medium, said fuel and water containers are connected to an on-board pre-start-up processor wherein the on-board pre-start-up processor signals the respective containers to dispense their respective contents to the emulsion container, said emulsion container is connected to a conventional fuel cell reformer through an outlet connector, and said emulsion container is connected to an on-board start-up processor wherein the on-board start-up processor signals the emulsion container to dispense the contents of the emulsion container to the fuel cell reformer.

11. The fuel container of claim 8 further comprising a surfactant or mixture of surfactants in solid or gel form wherein the surfactant or mixture of surfactants is released into the fuel at a rate that provides a concentration of 50 to 500 ppm of surfactant in the fuel at the time the fuel is dispensed into the emulsion container.

12. The water container of claim 8 further comprising a surfactant or surfactant mixture in a solid or gel form wherein the surfactant or surfactant mixture is slowly released into water at a rate that provides a concentration of 50 to 500 ppm of surfactant in the water at the time the water is dispensed into the emulsion container.

13. The vehicle of claim 2 wherein said emulsion is stored as a water-in-fuel emulsion.

14. The vehicle of claim 3 wherein the surfactant container includes a mixture of surfactant and fuel in the ratio of 99:1 to 30:70 wt %.

15. The vehicle of claim 14 wherein said ratio is 60:40 wt %.

16. The fuel cell system of claim 1 further comprising a water gas shifter.

17. The fuel cell system of claim 1 wherein said fuel is gasoline, kerosene, jet, or diesel fuel and combinations thereof.

18. The fuel cell system of claim 17 wherein said fuel includes oxygenates.

* * * * *